No. 857,182. PATENTED JUNE 18, 1907.
F. R. LANCASTER.
HAND POTATO DIGGER.
APPLICATION FILED OCT. 6, 1906.
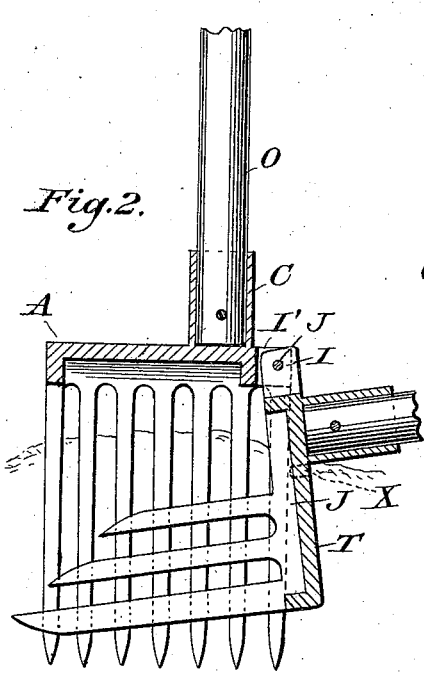
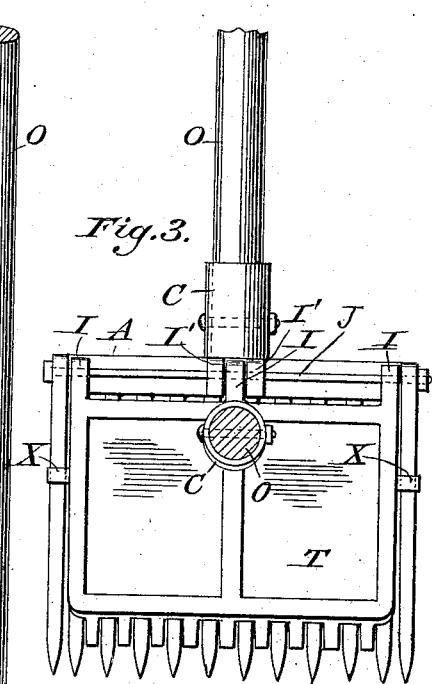
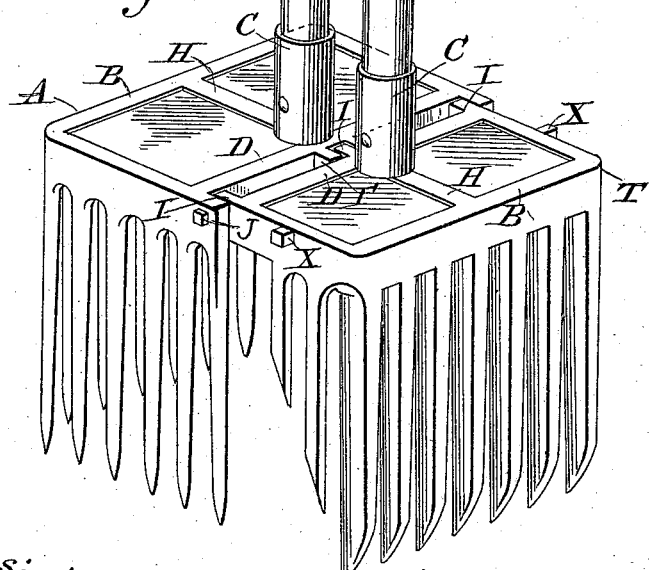
Witnesses:
Carl M. Graham
Francis B. Moe
Inventor:
Frank R. Lancaster
THE NORRIS PETERS CO., WASHINGTON, D. C.

UNITED STATES PATENT OFFICE.

FRANK R. LANCASTER, OF SOUTH WHITLEY, INDIANA.

HAND POTATO-DIGGER.

No. 857,182.          Specification of Letters Patent.          Patented June 18, 1907.

Application filed October 6, 1906. Serial No. 337,808.

To all whom it may concern:

Be it known that I, FRANK R. LANCASTER, a citizen of the United States, residing at South Whitley, in the county of Whitley and State of Indiana, have invented a new and useful Hand Potato-Digger Machine, of which the following is the specification.

My invention relates to an improvement in hand potato diggers by means of two forks, one a scoop fork, the other a receptacle fork or basket joined together to enable the operator to lift the entire hill of potatoes from the soil and gather them at one and the same operation. I attain these objects by the mechanism illustrated by the accompanying drawing and model, in which the complete machine is shown as well as its various parts and the manner of their attachment to each other.

The letters refer to the different parts.

Figure 1, shows a full view of the hand potato digger when set up and ready to be put in operation, Fig. 2 is a side view of the hand potato digger when the same is closed in operation and Fig. 3 shows the top of the digger when the same is closed.

The two forks of which the machine is constructed are referred to as the receptacle fork marked A and the scoop fork, marked T. The tines of the different forks are attached to a rectangular rim marked B. The tops of the tine rims are closed and provided with sockets marked C for the attachment of wooden handles, marked O. The tine rim of fork T is constructed so that its ends will pass inside of the ends of tine rim of fork A and the two are provided with projections marked I, through which a connecting rod, marked J passes to connect the two forks. The tines of the forks are attached to the under side of the tine rim B, parallel with each other, so that when the forks are connected they will form an inclosure or basket with the open end below as shown in the drawing. The tine rims are supplied with stops marked X so that when the handles of the forks are drawn apart they allow the tines of the forks to pass each other and close the receptacle. The heads of the forks, formed from the inclosed tine rims are provided with braces marked H which extend from socket C to the outer side of the tine rims. In fork T the tines on the sides are shorter than the tines on the end of the same and extend from the tine rim to a line drawn from the end of the connecting bolt J to the free end of the tines on the end of the fork.

The potato digger forms a receptacle or basket which may be opened and closed and is operated by placing the open machine over the hill of potatoes, pressing the same into the soil and then bearing down on the handle of scoop fork T, thus closing the receptacle to include the contents of the potato hill. The dirt is then shaken out and the potatoes may be deposited in a crate.

I claim:

1. A potato digger consisting of two forks, a receptacle fork A and a scoop fork T hinged together by means of the projections I and the bolt J, the closed tine rims B of said forks together forming a rectangle which with the tines attached thereto form an open basket which may be closed for the purposes set forth.

2. The scoop fork T supplied with stops X and the tines on the sides of a shorter length than the remaining tines of the forks for the purpose stated.

FRANK R. LANCASTER.

Witnesses:
     CASH. M. GRAHAM,
     A. L. SLAGLE.